INVENTORS
ROLAND P. GEHMAN
EUGENE G. MARTIN
EDGAR H. SMITH

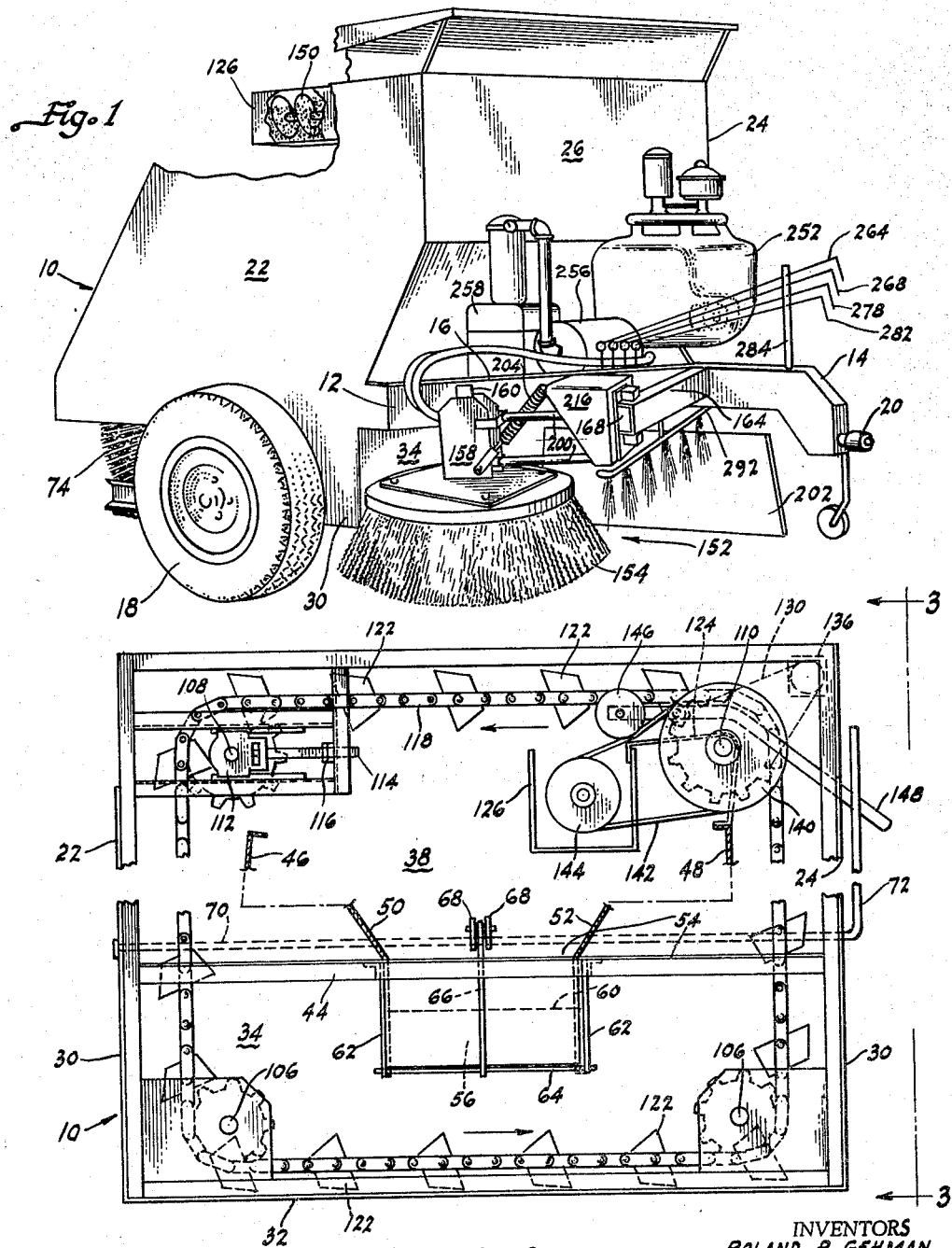

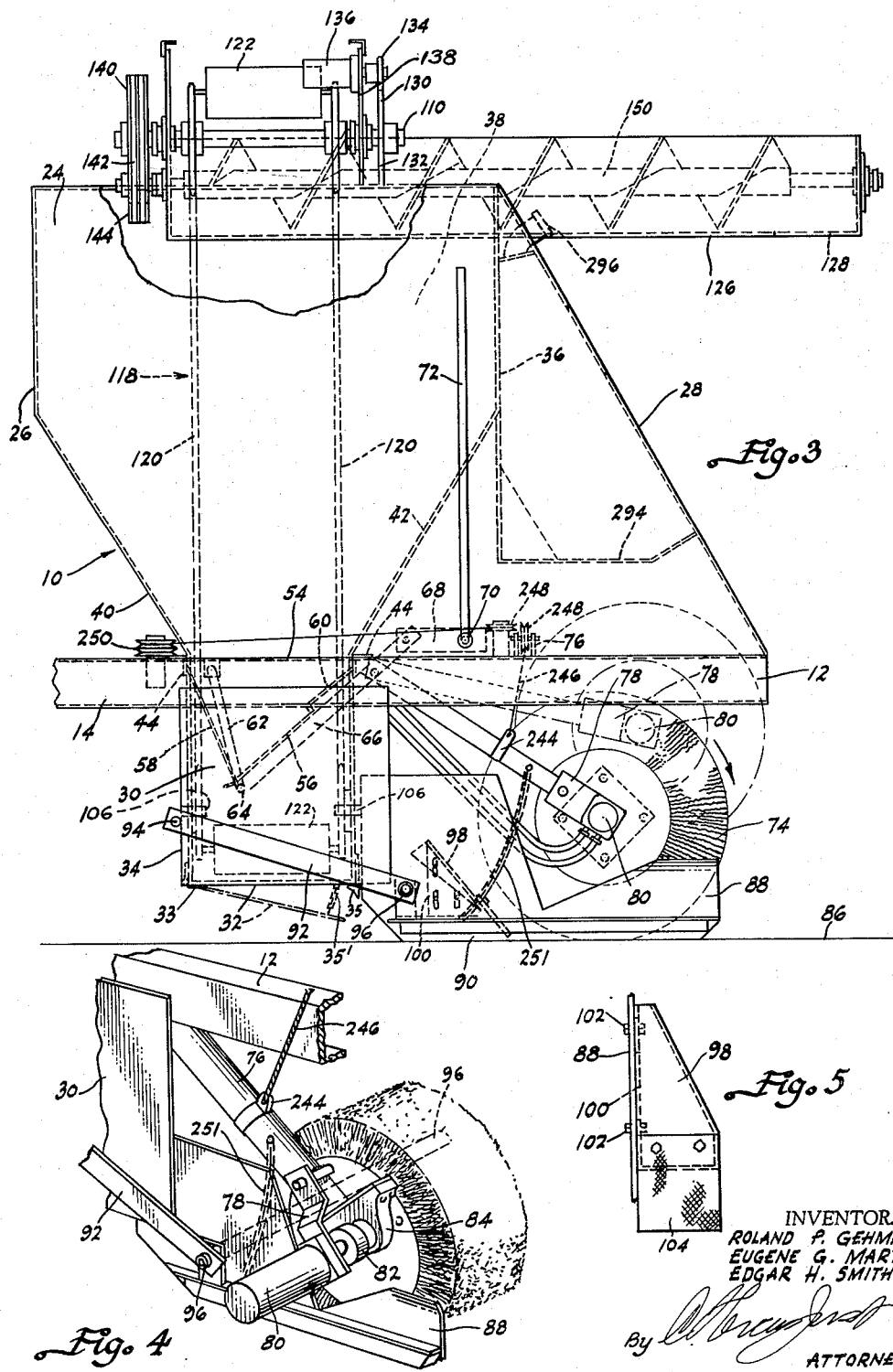
June 1, 1965     R. P. GEHMAN ETAL     3,186,016
STREET SWEEPING MACHINE
Filed March 21, 1963     4 Sheets-Sheet 2
INVENTORS
ROLAND P. GEHMAN
EUGENE G. MARTIN
EDGAR H. SMITH
By 
ATTORNEY

By
ATTORNEY

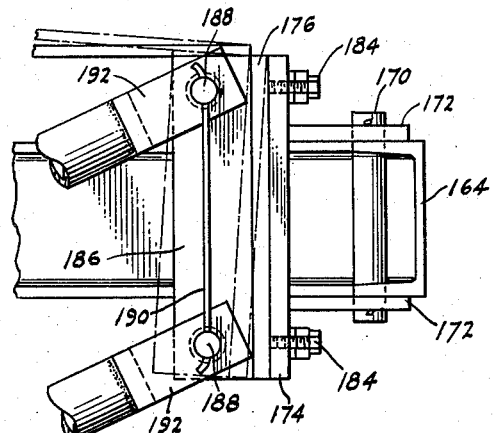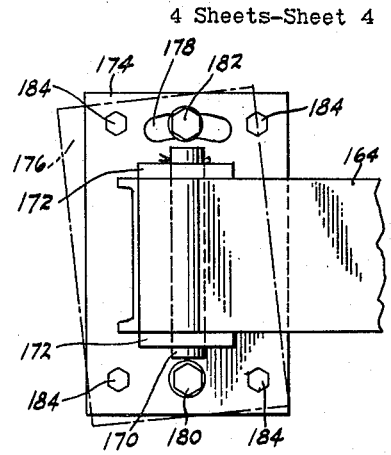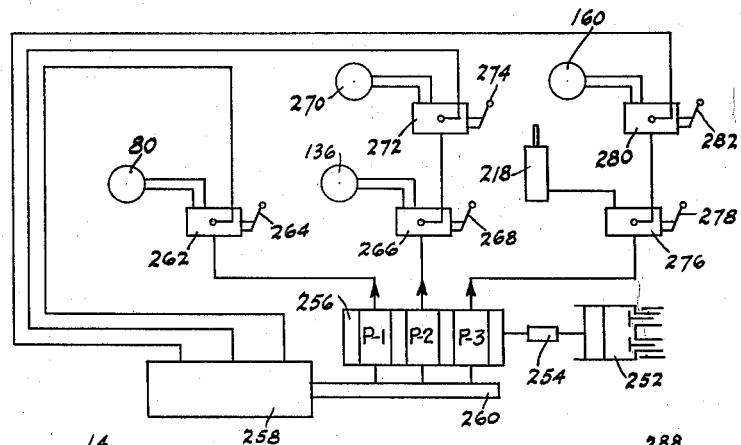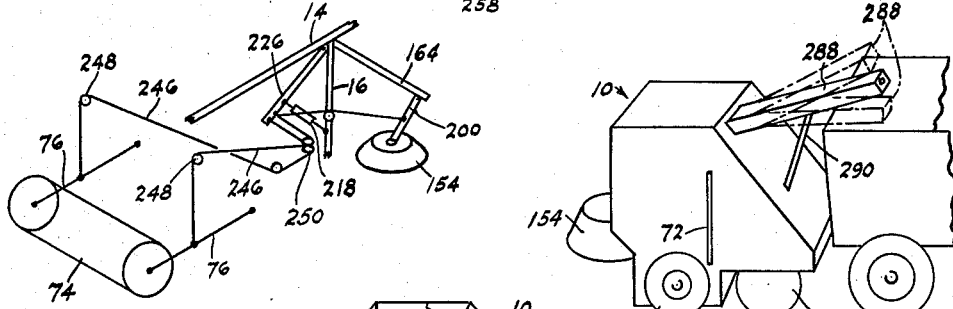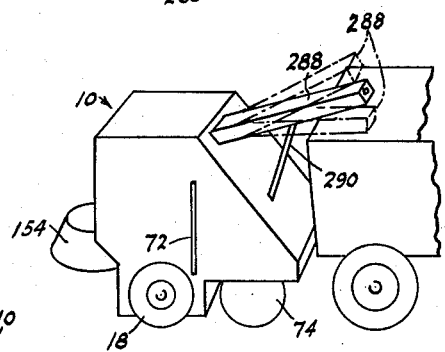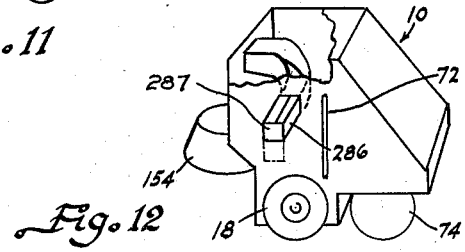
INVENTORS
ROLAND P. GEHMAN
EUGENE G. MARTIN
EDGAR H. SMITH
ATTORNEY 3,186,016
STREET SWEEPING MACHINE
Roland P. Gehman and Eugene G. Martin, Stevens, and
Edgar H. Smith, New Holland, Pa., assignors to MGS,
Inc., Reamstown, Pa., a corporation of Pennsylvania
Filed Mar. 21, 1963, Ser. No. 266,951
11 Claims. (Cl. 15—85)

This invention pertains to a street sweeping machine and, preferably, a street sweeping machine having both a substantially transverse and horizontal pickup brush as well as a curb brush. In its preferred construction, the street sweeping machine embodying the present invention is a trailer unit supported on at least a pair of wheels respectively mounted at opposite sides of the unit and the unit also being provided with a forwardly extending hitching means for attachment to the rear end of a tractor or relatively light weight truck so as to be propelled thereby. However, it is within the purview of the present invention that the novel aspects of the street sweeping machine may be applied to a self-propelled machine, especially by employing a suitable forward wheel assembly capable of being steered and using a more powerful engine than presently contemplated for purposes of driving the various movable elements of the machine so as to provide sufficient power to propel the vehicle such as by driving certain wheels thereof.

Street sweeping machines of various kinds have been employed for many years, especially by the sanitary departments of certain cities and other urban-type municipalities. In recent years, the trend has been to utilize street sweeping machines which are of the self-propelled type and embodying both transverse pickup brushes as well as curb or gutter brushes. Such machines also include means to elevate the sweepings into storage means within the machine. In the main however, presently used machines of this type are quite complex and employ substantial mechanism of an expensive nature. Even though embodying various desirable features, there are also certain aspects of such existing machines which prevent them from achieving the highest possible type of efficiency with respect to sweeping street and roadway surfaces. A further difficulty largely common to existing street sweeping machines resides in difficulties encountered with unloading the accumulated sweepings from the storage means in the machine, and mechanism employed only for such unloading functions are required in the machines in addition to additional or separate mechanism for receiving the sweepings from the brushes and moving the same to the storage portions of the machines.

It is the principal object of the present invention to provide a street sweeping machine which will have all of the benefits and advantages of existing machines but, in addition, operates more efficiently, especially by utilizing certain mechanisms in the machine for dual purposes, whereby the overall cost of the machine is approximately only half that of existing street sweeping machines which are capable of performing a comparable range of functions of the machine comprising the present invention.

Another object of the invention is to provide conveyor means to move sweepings received from the pickup brush to ample sized receptacle means of a bin-like or hopper nature within the machine, and also employing said conveyor means in the additional function of unloading accumulated sweepings within said receptacle, especially when the receptacle is full and requires emptying.

A further object of the invention is to provide a curb brush which is supported by mechanism enabling the brush to be pulled as distinguished from being pushed as in most existing street sweepers, whereby possible injury to the brush as a result of encountering obstruction is minimized due to the ability of the brush to yield from its normal position as a result of such mounting means.

Still another object of the invention is to support the substantially horizontal and transverse pickup brush by means which permits the brush, when in use, to be supported by the bristles of the brush engaging the street surface being cleaned, whereby maximum sweeping efficiency is assured, the machine also including means however to elevate the pickup brush a limited amount above the surface to be cleaned as when the machine is being moved when no sweeping is desired.

A still further object of the invention is to provide several different types of discharge means capable of receiving accumulated sweepings from the storage receptacle of the machine as delivered to said discharge means by the conveyor which also is used to fill the storage receptacle when the brush is operating, it being a still further object in conjunction with this object to provide means by which at least one type of discharge mechanism may be used to discharge sweepings from the machine while the sweeping function of the machine is being performed.

Still another object of the invention is to provide side guards at opposite ends of the pickup brush which preferably engage the street surface being cleaned in a sliding manner so as to prevent the pickup brush from scattering sweepings laterally incident to the sweepings being brushed into the receiving means of the machine and, as an adjunct to this object, it is a still further feature of this object to provide guide means for directing sweepings adjacent opposite ends of the pickup brush into the receiving means of the machine, whereby no rows of dirt or other sweepings remain on the street surface adjacent ends of the pickup brush as is frequently found to be the condition after a street has been swept by a conventional street sweeping machine.

One further object of the invention is to provide power-actuated elevating means for simultaneously elevating the pickup brush and the curb brush and maintain the same in elevated, inoperative position, there also being additional means to retain the curb brush in such elevated, inoperative position when it is desired to operate the pickup brush only, as when sweeping surfaces such as alleys, which normally have no curbs, this function of the machine also being capable of being employed in regard to sweeping parking lots, certain factory or warehouse floor surfaces, and the like.

Still a further object of the invention is to provide refinements in the mounting means for the curb brush which normally rotates about a substantially vertical axis, such refinements permitting this axis to be tilted at an angle to the vertical within reasonable limits so as to enable the curb brush to conform to street and gutter surfaces having appreciable slopes from the horizontal such as in relation to streets or roadways having relatively high crowns with respect to the width of the street or roadway.

One further object of the invention is to provide self-contained power means on the preferably trailer-type street sweeping machine comprising the present invention for purposes of actuating the several brushes on the machine, the elevating mechanism for moving the sweepings to the receptacle therefor, operating the hoisting mechanisms for the brushes, and also actuating the several embodiments of discharge means, such power mechanism also being provided with control means which is actuated by manually-operable elements positioned within ready access to an operator at the forward end of the trailer-type street sweeping machine as when being pulled by a tractor or, as an alternative, flexible actuating means may be extended from the control means to a truck cab or the like if a truck is utilized to propel the street sweeping machine.

In order to provide the street sweeping machine comprising the present invention with all the advantages of presently available street sweeping machines of other types, the machine comprising the present invention also is provided with a water storage tank and means to deliver sprinkling water therefrom so as to control the scattering of dust by the machine during operation.

Details of the foregoing objects and of the invention, as well as other objects thereof, are set forth in the following specification and illustrated in the accompanying drawings comprising a part thereof.

In the drawings:

FIG. 1 is a perspective view of a street sweeping machine embodying the principles of the present invention as seen from one forward corner of the machine, a portion of one of the upper corners being broken away to illustrate certain details to advantage.

FIG. 2 is a vertically foreshortened, transverse sectional view of the elevating and receptacle means for the sweepings.

FIG. 3 is a side elevation particularly of the elevating, receptacle, and one embodiment of discharge mechanism, substantially as seen from the line 3—3 of FIG. 2, this elevation also illustrating the pickup brush and guard means at the ends thereof.

FIG. 4 is a fragmentary perspective view of one end of the pickup brush and supporting means therefor, and also one of the end guards for said brush illustrated in operative position relative to said brush which is shown in fragmentary manner.

FIG. 5 is a plan view of a guide unit for sweepings which are mounted adjacent opposite ends of the pickup brush.

Figure 6:
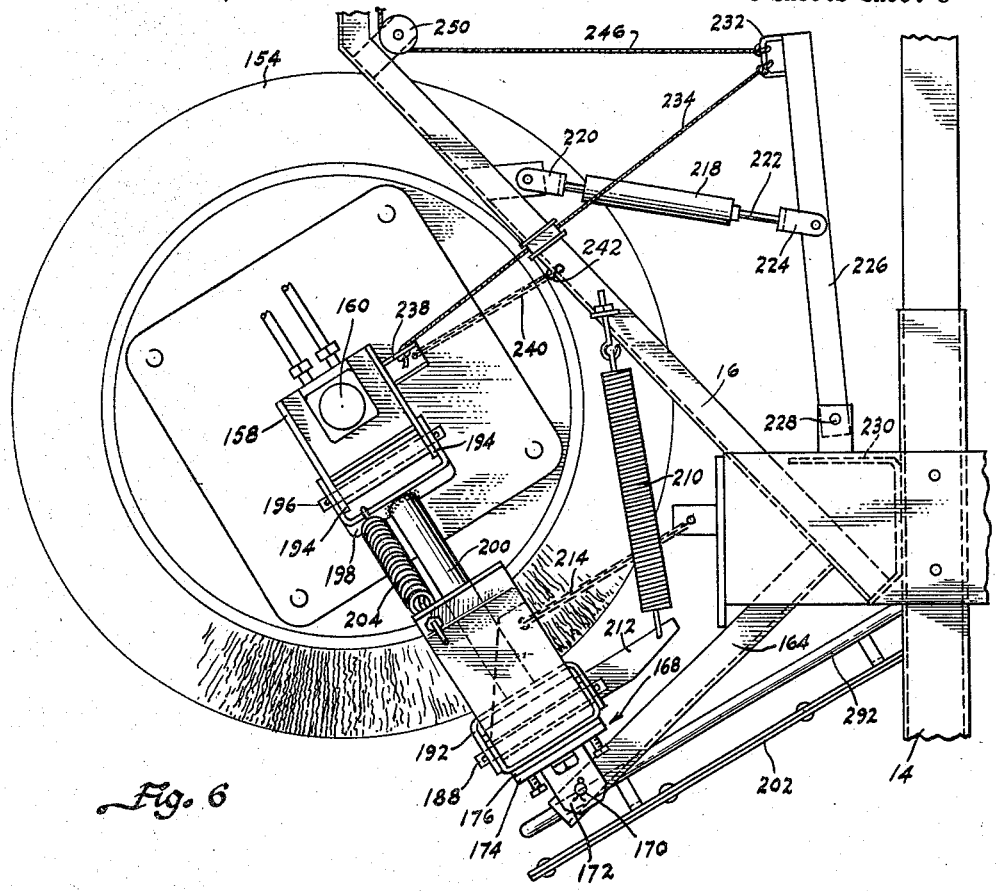
FIG. 6 is a top plan view of the curb brush of the street sweeping machine embodying the principles of the present invention and illustrating the mounting and control means for said brush, the latter being partially shown in fragmentary manner.

FIGS. 8 and 9 respectively are fragmentary views taken at right angles to each other of the adjustable mounting means for the curb brush which permits limited angular varying of the axis of rotation of the brush.

FIG. 10 is a power circuit diagram of the hydraulic mechanism employed to actuate the various movable elements of the street sweeping machine in accordance with the present invention.

FIG. 11 is a small, perspective and fragmentary diagrammatic view showing the cable and pulley layout of the means for elevating the brushes of the machine.

FIG. 12 is a perspective simplified illustration of the street sweeping machine employing a different embodiment of discharge mechanism from that shown in FIGS. 1 and 3.

FIG. 13 is a perspective view of the street sweeping machine employing the embodiment of discharge mechanism shown in FIGS. 1 and 3 and illustrating the manner in which the discharge therefrom may take place at a relatively high level such as for discharging into a truck body.

Referring to the drawings and particularly FIGS. 1 through 3, it will be seen that the street sweeping machine comprising the preferred constructions of the present invention is illustrated as being of the trailer type, arranged for connection to the rear end of a tractor, relatively light weight pickup truck, or the like, to transport the cleaner along a street, roadway or other surface to be cleaned thereby. However, it is to be understood that the present invention is such that substantially all of the improvements and advantages afforded by the invention equally are applicable to street sweepers of the self-propelled type.

*Receiving means for sweepings*

The specifically illustrated street sweeping machine of the trailer type comprises a mobile body 10 including a frame 12 having a forwardly extending tongue 14 braced horizontally by at least one angular brace 16, which is part of frame 12, best shown in FIG. 6. Suitably supported by opposite sides of the frame 12 are conventional rubber tired motor vehicle wheels 18 positioned respectively at opposite sides of the body 10 and preferably of the heavy duty type. An appropriate hitch 20 is connected to the forward end of tongue 14 for purposes of coupling the tongue to a tractor vehicle of appropriate type.

The body 10 comprises opposite sides 22 and 24 which may be formed from suitable sheet metal, the upper edges of said sides being relatively high with respect to the ground so as to provide substantial capacity within the body for the accumulation of sweepings as well as to provide ample space for the other mechanism contained therein, details of which are described hereinafter. The sides are connected at their forward ends by a front panel 26 and the rear edges of the sides are connected by a rear panel 28.

Lower side extensions 30 depend at opposite sides of frame 12 below said frame and extending between the lower edges of the extensions 30 is a horizontal bottom plate 32 resembling a shelf which extends rearwardly and comprising a receiver for sweepings. The forward edges of the lower side extensions 30 are connected by a vertical front panel 34, while the rear edges of said extension are unconnected in any way and define the sides of a vertical opening to receive sweepings from the pickup brush, to be described, such sweepings being received by and accumulating upon such receiver plate or shelf 32. The plate 32 may be connected at its forward edge to the lower edge panel 34 by hinges 33 and latched in horizontal position by latches 35 adjacent opposite ends of the plate. When dropped to the dotted line position shown in FIG. 3, as controlled by chains 35', the plate is in discharge position, to be described hereinafter.

Extending transversely between the sides 22 and 24 of the body 10 interiorly of the rear panel 28 is a vertical plate 36 which comprises the rear wall of an interior hopper type receptable 38 within which sweepings are accumulated until the same are to be discharged from the machine. Preferably, the front panel 26 has a downwardly and rearwardly sloping lower panel 40 which is opposite to a correspondingly forwardly sloping transverse interior panel 42, the panels 40 and 42 comprising the lower portions of the receptacle 38. The lower edges of the panels 40 and 42 are supported by transversely extending angle irons 44.

Referring to FIG. 2, which is vertically foreshortened by exemplary breaks occurring midway of the sides thereof, it will be seen that the receptacle 38 also is defined by side plates 46 and 48 which extend between the front panel 26 of the body and vertical plate 36 defining the rear wall of receptacle 38. The lower portions 50 and 52 of said side plates 46 and 48 slope inwardly toward each other as shown in FIG. 2. Thus, it will be seen that the lower portion of both the side and end walls defining the interior receptacle 38 slope toward a common exit throat 54.

Discharge of accumulated sweepings from the receptacle 38 through the exit throat 54 is controlled by a relatively simple but effective movable gate 56 preferably disposed at an angle to the horizontal as shown in FIG. 3. Cooperating with gate 56 are a pair of extension plates 58 and 60 respectively depending downwardly from sloping lower panels 40 and 42 and connected thereto adjacent exit throat 54. The lowermost edge of exit gate 56 is supported by a pair of spaced links 62 respectively depending downwardly from suitable brackets adjacent opposite sides of exit throat 54. An appropriate rod 64 extends between the lower ends of links 62.

Underlying the exit gate 56, which may comprise a relatively simple plate of sheet steel, is either a single intermediate bar 66, as illustrated in dotted lines in FIG. 2 for example, for if desired, a pair of such bars may be utilized and positioned respectively adjacent opposite ends of rod 64. Said bar or bars 66 extend parallel to the gate 56 and upwardly beyond the extension plate 60 as best shown in FIG. 3, for connection to crank arms 68 which are fixed at one end to transverse crank shaft 70 intermediately of the ends thereof. The opposite ends of crank shaft 70 preferably are supported in appropriate bearings in the sides 22 and 24 of the body 10 and extending upwardly from one end of crank shaft 70 is a substantially vertical, elongated operating handle 72. In its lowermost position such as that shown in FIG. 3, the exit gate 56 is closed with respect to the discharge opening extending between the lower edges of extension plates 58 and 60.

Pickup brush

Positioned rearwardly of the receiver 32 is a substantially horizontal pickup brush 74 of the conventional bristle type. Said brush extends transversely across the machine and is substantially coextensive in length with the receiver 32. The brush is supported by relatively simple means comprising a pair of downwardly and rearwardly extending arms 76, the forward and upper ends of which are pivotally connected by suitable means to the opposite side members of frame 12 as shown in exemplary manner in FIGS. 3 and 4. Connected to one of the arms 76 is a bracket 78 which supports a hydraulic rotary motor 80, said motor being connected by an appropriate coupling 82 to the shaft which supports brush 74 in bearings 84 respectively carried by the lower ends of the arms 76 at opposite sides of the machine. Appropriate hydraulic conduits of conventional type are connected to the hydraulic motor 80 in accordance with the power diagram illustrated in FIG. 10. In normal operation, the brush 74 rests directly upon the surface being cleaned by the brush, whereby the brush is supported by its own bristles as distinguished from any suspension means connected to the arms 76.

Particularly as seen from FIG. 3, wherein the relative positions of the brush 74 and sweeping-receiver 32 are illustrated in exemplary manner, the brush 74 is rotated in clockwise direction, as shown by the exemplary arrow therein, whereby dirt and other sweepings upon the surface being cleaned are brushed forwardly and somewhat upwardly by the bristles of the brush onto the shelf-like receiver 32 which is disposed relatively close and substantially parallel to the surface 86 which is being swept by the machine, the same being illustrative of a street, roadway, parking lot, or otherwise. In order to prevent lateral spreading of the sweepings being generated by brush 74, the machine comprising the present invention also includes a pair of longitudinally extending guard plates 88 which are provided with wear-resistant tread plates 90 extending around the lower edges thereof. Rubber belting or composite rubber tire material is suitable for the tread plates 90 and these drag along the surface 86 while the brush 74 is operating.

The forward ends of plates 88 are connected to the opposite sides of the machine by rearwardly extending links 92 respectively positioned exteriorly of the lower side extensions 30, the forward ends of links 92 being pivotally connected to short pins 94 fixed to panel 34, and the rearward ends of the links 92 being pivotally connected to the opposite ends of a cross bar 96, such as a tube which is welded at its opposite ends to the forward ends of the guard plates 88, appropriate projections extending outward from the plates for connecting links 92 thereto. The guard plates are pulled by links 92 in such a manner that they appropriately can yield upwardly to any obstruction encountered thereby during the movement of the street sweeping machine over the surface 86 and the cross bar 96 tends to brace the plates relative to each other. Correspondingly, the rearward and downward extending relationship of the arms 76 to the frame 12 and brush 74 is such as to pull the brush in the direction of movement of the street sweeping machine, whereby the brush 74 readily may yield vertically to any variations in the surface 86 being swept thereby.

In accordance with the operation of many conventional types of street sweeping machines, a row or irregular band of dirt frequently remains upon the surface being swept by the brushes of such machines due to the inability of the brush effectively to sweep cleanly at the very ends of the brush. To preclude this from happening when using the machine comprising the present invention, there is a sweeping guide 98 extending transversely inward from the inner surface of the guard plates 88, the shape of the guides 98 being best shown in FIG. 5. Extending at a right angle to one edge of each guide 98 is a flange 100 which is parallel to the guard plates 88. The flange 100 is slidable vertically to receive a plurality of bolts 102 for purposes of adjustably connecting the guides 98 respectively to the guard plates 88.

Affixed to the lower edge of each of the guides 98 is a flexible, wear-resisting depending flap 104 which extends substantially to the surface 86, in use, and slides thereover. Flaps 104 cooperate with the guides 98 to provide upwardly and forwardly sloping surfaces which guide dirt and other sweepings engaged by the ends of the brush 74 and guide the dirt upwardly and forwardly onto the shelf-like receiver 32, it being understood that the endmost bristles of the brush 74 are disposed quite closely to the guard plates 88, whereby this assembly of the pickup brush 74 and the guard plates 88, in conjunction with the guides 98 comprise an effective means for efficient sweeping by the pickup brush for substantially the full length thereof, the arrangement also insuring the deposit of substantially all of the sweepings onto the receiver 32.

Conveyor for sweepings

Sweepings deposited upon receiver 32 are moved therealong and elevated therefrom for transfer into the receptacle 38 by endless belt means which support pickup buckets in spaced relationship to each other, details of which are best shown in FIG. 2. Two pairs of stub sprocket shafts 106 are supported respectively by appropriate brackets in the lower portion of the enclosure immediately above receiver 32 and adjacent opposite ends thereof, as shown in FIG. 2, and a pair of upper through sprocket shafts 108 and 110 are supported by suitable bracket mechanism adjacent opposite sides of the body 10. The shaft 108 is supported in slidable bearings 112 mounted in appropriate guideways shown in FIG. 2 and said bearings are movable by threaded shafts 114 on which suitable nuts 116 are positioned to force the bearings toward the left as viewed in FIG. 2 and thereby place the conveyor 118 under tension.

Carried by each of the sprocket shafts 106, 108 and 110, adjacent opposite ends thereof, are axially spaced sprocket gears which are engaged by a pair of spaced endless sprocket chains 120, the spacing thereof being best shown in FIG. 3. Between the chains 120 and evenly spaced longitudinally thereof, are a plurality of scoop-like buckets 122 which preferably are fixed relative to the chains in such manner that they are non-rotatable about the axes of the connecting pins or other similar means which secure the buckets to the chains. Thus, it will be seen from the lower portion of FIG. 2, that the buckets 122 are arranged to be moved by the chains in the direction of the arrow and, during such movement, scoop up the accumulated sweepings deposited upon receiver 32 and move the same toward the right and then upwardly, passing around the sprockets supported by shaft 110.

As moved around said sprockets, it will be seen from the illustration of the buckets 122 in the upper portion of FIG. 2, that said buckets are tilted so as to dump the elevated sweepings therefrom onto receiving plate 124 and if any accumulation of the sweepings occurs on plate 124, further movement of the buckets 122 will advance the sweepings into the inner end of discharge trough 126 which comprises one embodiment of discharge means, the relationship thereof to the mobile body 10 best being illustrated in FIG. 3. The outer end of trough 126 is provided with a discharge opening 128 in the bottom thereof for the delivery of sweepings to a truck body, onto the ground, or otherwise.

Shaft 110 is driven by a sprocket chain 130 which extends around a sprocket gear fixed to shaft 110 and a sprocket pinion 134 which is fixed to the drive shaft of a hydraulic motor 136 supported by plate 138, whereby motor 136 drives the conveyor 118. Also connected to shaft 110 at the opposite end thereof from that which is connected to sprocket gear 130 is one or more drive pulleys 140 around which a plurality of flexible belts 142 extend, the same also extending around one or more driven pulleys 144, a belt-tightening idler 146 engaging the belts 142 and being placed under pressure thereagainst by suitable manually operable lever 148.

Discharge mechanism

The driven pulleys 144 are connected to one end of the shaft of additional conveying means comprising a spiral screw 150 rotatably disposed within the discharge trough 126, the same being rotatable in a direction to move sweepings deposited into the inner end of the trough to the outer end thereof for discharge through opening 128. The tension of the belts 142 is such that when the idler 146 is released from the belts, there is not sufficient tension imposed by belts 142 upon pulleys 144 to drive the spiral screw 150, whereby the tensioning idler 146 and its operating lever 148 comprise clutch means for rendering the spiral screw 150 operative or inoperative.

During loading operation, when the receptacle 38 is being filled through operation of the conveyor 118, the exit gate 56 is closed and the spiral screw 150 is inoperative, whereupon sweepings elevated by the buckets 122 and discharged onto the receiving plate 124 will accumulate in the inner end of trough 126 until it spills over the sides of said trough and down into the receptacle 38. When it is desired to unload or empty the receptacle 38 into a truck, for example, the lever 72 is moved clockwise, as viewed in FIG. 3, for purposes of moving the exit gate 56 to any degree of opening desired, whereupon the accumulated sweepings within receptacle 38 will fall onto receiver 32 from which they previously have been elevated into receptacle 38. Motor 136 then is placed in operation in order to move the conveyor 118 for purposes of again elevating the sweepings discharged onto receiver 32 into the inner end of trough 126 but, at the commencement of the unloading or emptying operation, the idler 146 is depressed to place belts 142 under tension and thereby drive spiral screw 150 so that, as the sweepings are deposited into the inner end of trough 126, they are moved to the discharge opening 128 at the outer end thereof for complete removal from the street sweeping machine, from which they are discharged, as indicated above, into a suitable truck, or if desired, onto the ground, or otherwise.

If it is desired to discharge the sweepings from trough 126 onto the ground, it is only necessary to leave belts 142 untensioned, drop receiver 32 to its dotted line position shown in FIG. 3 to permit it to slope rearward and downward, and open gate 56 to the desired extent. Gravity will cause accumulated sweepings to fall from the hopper onto receiver 32 and from there onto the ground, as when emptying into a land-fill refuse site.

It thus will be seen that the conveyor 118 and receiver 32 play a double role in the operation of the street sweeping machine of the present invention in that the same first are operable to fill the receptacle 38 and the same mechanisms subsequently are employed to discharge the accumulated sweepings from the receptacle 38 and, moreover, from the street sweeping machine itself, thereby economizing in the required mechanism to perform these respective functions of filling the receptacle and emptying or discharging the accumulated sweepings therefrom.

Curb brush

Figure 7:
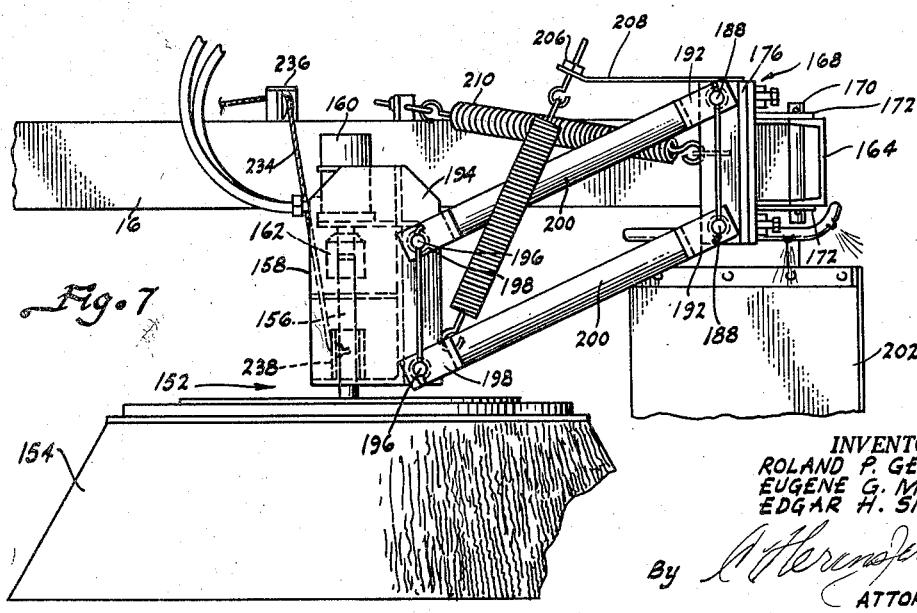
FIG. 7 is a side elevation of the curb brush illustrated in FIG. 6 substantially as seen from the left side of FIG 6.

To further enhance the efficiency and adaptability of the machine comprising the present invention, it preferably is provided with a curb brush assembly 152 comprising a circular curb brush 154 having a supporting and driving shaft 156, see FIG. 7, projecting from the upper end thereof and disposed substantially vertically during normal operation of the brush. A supporting head 158 for the curb brush is provided with suitable bearing means to receive the shaft 156. Said head also, at its upper end, supports another hydraulic motor 160 which is connected through a suitable coupling 162 to the upper end of shaft 156.

The entire curb brush assembly 152 is supported by a laterally projecting frame member 164, see FIG. 6, which is fixed at its inner end to frame member 16. The outer end of frame member 164 supports a bracket 168 for limited pivotal movement about a substantially vertical axis comprising a pin 170. For convenience, the frame member 164 preferably comprises a channel member, the flanges of which extend substantially horizontally and bearing holes, in vertical alignment with each other, are formed in the upper and lower flanges of the channel member 164 in order to accommodate the pivot pin 170. Vertically spaced horizontal ears 172 also comprise part of the bracket 168 and these ears closely overlie the flanges of the channel member 164, as clearly shown in FIG. 7. The bracket 168 also comprises a vertical plate 174 which, in general, is complementary to another vertical plate 176.

Plate 174, adjacent the upper end thereof, is provided with an arcuate slot 178 and adjacent the lower edge thereof is provided with a hole through which a bolt 180 projects which serves as a pivot means for movement of plate 176 relative to plate 174 and any desired relative angular position of plate 176 with respect to plate 174 is maintained by a clamping bolt 182 which extends through a hole in plate 176 and also through the slot 178 in plate 174.

Additional adjustment of the plate 176 with respect to plate 174 is accomplished by a plurality of stud bolts 184 which, for example, are threaded through tapped holes respectively adjacent the corners of plate 174, the inner ends of such stud bolts engaging the inner surface of plate 176. Accordingly, when the nuts on bolts 180 and 182 are loosened sufficiently to permit desired adjustable movement of the stud bolts 184 so as to dispose either the upper end or the lower end of plate 176 in spaced relationship to the corresponding end of plate 174, within a limited amount of movement, the stud bolts 184 are moved to effect such desired adjustable positioning of the plates 174 and 176 with respect to each other and then the nuts on bolts 180 and 182 again are tightened. Accordingly, within a limited extent, substantially universal movement between plates 174 and 176 is possible. Nevertheless, the axis of the curb brush and shaft 156 is substantially vertical even though at an angle of a few degrees from being truly vertical in any selected position of adjustment.

Plate 176 has a vertically extending channel 186 connected thereto. Extending between the flanges of channel 186 adjacent opposite ends thereof are pairs of horizontally aligned pins 188 which are maintained in nonrotatable relationship with respect to said bearing holes by means of a stabilizing wire or pin 190 which extends through appropriate holes in one end of each of the pins 188.

Extending along the outer surfaces of the flanges of vertical channel 186 are the opposite ears of U-shaped heads 192. Supporting head 158 of the curb brush assembly also is provided with a pair of parallel flanges 194 having transversely aligned holes formed therethrough respectively adjacent opposite ends thereof for purposes of receiving parallel, transversely extending pivot pins 196 therethrough. Pins 196 are similar to pins 188 and are for a similar purpose in that the same pivotally support a pair of U-shaped members or heads 198, the legs of which are disposed in close relationship to the flanges 194.

Extending between the uppermost pair of U-shaped heads 192 and 198, and also between the lowermost pair of U-shaped heads 192 and 198, respectively, are supporting bars 200 which are substantially parallel to each other as best shown in FIG. 7. The opposite ends of the bars 200 are firmly fixed to the intermediate portions of the U-shaped heads to which they are connected, preferably by welding or the like. The vertical spacing of the U-shaped heads 192 with respect to each other as well as the vertical spacing of the U-shaped heads 198 with respect to each other, coupled with the relatively wide spacing of the opposite legs of said U-shaped heads and the pivotal support thereof by the pins 188 and 196, results in the shaft 156 of the curb brush 154 always being substantially parallel to the substantially vertical axis of the plate 176 and, depending upon the adjusted position of said plate with respect to vertical plate 174, as dictated by the slope of the surface being swept relative to the horizontal, the shaft 156 of the curb brush can be disposed substantially vertically to that surface and maintained in such relationship, regardless of limited vertical movements of the curb brush 154 relative to its supporting mechanism.

It has been found from experience that if the weight of the brush 154 is in suitable relationship to the speed at which the brush is rotated, the angle of the axis of the shaft 156 thereof is disposed so that the brush rests principally on the forward-most bristles during rotation while the driving head is supported directly by the bristles of the brush in engagement with the surface being swept, and the length of arms 200 is adequate to provide an effective lever arm, the brush will tend to maintain itself in engagement with the curb along which it is operating so as to sweep dirt and other debris adjacent the curb away therefrom. Preferably the dirt is swept by the brush against an angularly disposed baffle or shield 202, which is supported by suitable brackets interconnected to frame member 164, so as to form a sort of windrow of such dirt, whereby the windrow may be engaged by the rotating pickup brush 74 so as to brush the same onto receiver 32. However, to insure, if desired, that no excessive wear be imposed upon the bristles of brush 154 due to the bristles supporting the entire weight of the brush and its driving mechanism, it is contemplated by the present invention to provide a tension spring 204, the force of which may be regulated within reasonable limits by nut 206 which engages bracket 208 that supports one end of the spring, while the opposite end of the spring may be connected for example to the lowermost end of the lower supporting bar 200.

Notwithstanding the above-described possible normal engagement of the curb by the curb brush 154, and especially for purposes of insuring that the curb brush will be extended into engagement with the curb, the present invention also contemplates the use of an additional tension spring 210. Such spring 210 extends between angular frame member 16 and a lateral arm 212, see FIG. 6, connected to the vertical channel 186 so as normally to urge the outer, rearward ends of supporting bars 200 laterally outward toward the curb and, correspondingly, urge the brush 154 supported thereby toward said curb. Such outward movement of the brush however may be limited by any suitable means such as chain 214 shown in FIG. 6. If desired, the supporting mechanism shown at the forward upper ends of bars 200 may be covered by a suitable shield 216 best shown in FIG. 1.

Especially from FIG. 6, and considering the fact that the street sweeping machine comprising the present invention normally moves in the direction of the arrow shown upon tongue 14, it will be seen that the propelling movement of the curb brush 154 is in a pulling relationship with respect to the movement of the machine. This is due to the fact that the supporting bars 200 extend principally rearwardly, although somewhat laterally outward. In any event, it readily can be appreciated that if an obstruction of any kind is encountered adjacent the curb, the brush 154 readily may yield laterally away from the curb and toward the machine, especially against the action of spring 210 if such spring is employed, all without injury of any kind to the curb brush or its supporting or driving mechanism.

The downward and rearward extension of these same supporting bars 200, especially as viewed in FIG. 7, is such that any obstruction extending upward from the surface 86 being cleaned by the brush, which is of such nature as to require vertical yielding of the brush to escape injuring the brush, likewise readily is accomplished and even is aided by the action of tension spring 204 if a spring of this type is employed.

*Brush retracting mechanism*

Relatively simple means are provided for retracting both the pickup brush 74 and the curb brush 154 from their lowered, operative positions in which, in accordance with the preferred principles of the invention, the brushes respectively are supported by their own bristles being in engagement with the surface being cleaned thereby. Certain elements of the brush retracting or elevating mechanism are shown in the various figures as will be referred to specifically hereinafter.

For an overall appreciation of the brush elevating mechanism, attention is directed especially to FIG. 11 which comprises a diagrammatic presentation of such mechanism. In addition to FIG. 11, attention is also directed to FIG. 6, wherein the power means for elevating the brushes is shown in detail. Such power means comprises a hydraulic cylinder 218 which is connected at one end by a suitable clevis 220 to a fixed portion of the frame of the machine, such as the angular brace 16. Slidable within the cylinder 218 is a piston having a piston rod 222 slidably projecting from the opposite end of the cylinder, the outer end of the rod being connected by a clevis 224 to an actuating lever 226 which is pivotally supported by pin 228 carried by bracket 230 fixed relative to tongue 14 of the machine or any other suitable fixed element on the frame of the machine. The opposite end of actuating lever 226 has appropriate connecting means 232 to which a plurality of cables are connected, as follows.

A cable 234 which is connected at one end to means 232 extends over a guide pulley 236 and the opposite end of the cable is connected to a bracket 238 which is connected to the head 158 which supports the curb brush and its driving means. Thus, when actuating lever 226 is moved in clockwise direction as viewed in FIG. 6, it will operate with respect to the curb brush to elevate the same above the surface being swept thereby and also move the brush about the pivot 170 therefor so as to dispose the same in close relationship to the adjacent side of the frame of the machine, thus holding the brush in inoperative position such as either when the curb brush is not to function, as on a parking lot or other surface having no curbs, or when the machine is being transported from one location to another without sweeping the surface over which it is transported. Further, for purposes of providing a safety means to secure the curb brush in such inoperative position, an appropriate latch such as a chain 240 is mounted to extend between bracket 238 and an appropriate hook 242 on brace 16, for example. Such latching mechanism comprising chain 240 is advantageous to secure the curb brush in its inoperative position when it is desired to operate the pickup brush 74 only.

The actuating lever 226, incident to elevating the curb brush 154 to inoperative position, also simultaneously elevates the arms 76 which support the pickup brush at its opposite ends. In FIG. 3, a connector 244 is shown fixed to one of the arms 76 and it will be understood that a similar connector is fixed to the opposite arm for purposes of connecting one end of one of a pair of cables 246 respectively to the brush-supporting arm 76. The cables 246 are trained over various guide pulleys 248 and the cables respectively connected to the arms 76 ultimately perspectively are trained around one pulley of the double sheave pulley 250 and, especially as shown in FIG. 6, said cables 246 are both connected at their leading ends to the connecting means 232 on actuating lever 226.

From the above description, it will be seen that when the actuating lever 226 is moved clockwise as described with respect to elevating the curb brush 154, the cables 246 likewise are tensioned by the actuating lever 226 so as to simultaneously raise the pickup brush-supporting arms 76, whereby both brushes are elevated simultaneously to inoperative position, all through the simple operation of the single hydraulic cylinder 218 and the piston therein.

When the pickup brush is elevated by operation of the actuating lever 226, it also is desirable to elevate the guard plates 88. This is accomplished simply and readily by connecting such plates, preferably by flexible means such as chains 251, see FIGS. 3 and 4, to the arms 76 which support pickup brush 74 and by which such brush is raised and lowered. The chains are long enough to permit free-riding of the plates 88 upon surface 86 while the bristles of brush 74 also engage said surface. When brush 74 is to be elevated to inoperative position, however, the slack in chains 251 quickly is taken up during the initial upward movement of arms 76, whereupon elevation of plates 88 then occurs and such chains hold plates 88 elevated as long as brush 74 is elevated. The linkage 92 readily permits such elevation of plates 88 and aids in stabilizing the positions thereof while elevated.

When the curb brush 154 has been elevated to inoperative position and has been latched therein by a chain 240 being connected to hook 242, thereafter the operation of the hydraulic cylinder 218 may be reversed to move the lever 226 in counterclockwise direction and thereby permit lowering of the pickup brush-supporting arms 76 to dispose the pickup brush 74 against a surface to be cleaned thereby. Thus, the curb brush 154 is maintained in inoperative position while the elevating cable 234 therefor is rendered slack.

Power mechanism and controls

The power circuit for the machine and especially for actuating all of the various movable elements thereof is illustrated diagrammatically in FIG. 10. Certain parts of the power mechanism are also shown in FIG. 1 in the preferred mounting thereof which preferably is at the forward end of the body 10. Certain elements of the power means are relatively heavy such as the self-contained internal combustion engine 252 which is connected by suitable coupling 254 to a multiple unit hydraulic pump 256, there preferably being three pump units in the assembly respectively identified as P–1, P–2, and P–3.

A reservoir 258 for the hydraulic fluid communicates with a manifold 260 which serves all of the pumps in the pump unit 256. As will be seen from the diagram also, pump P–1 is connected through control valve 262, by conventional hydraulic conduits and said control valve is connected to the hydraulic motor 80 which actuates the pickup brush 74. A manually operable control handle 264 actuates valve 262 between ON and OFF positions.

Pump P–2 is connected by conventional hydraulic fluid conduit means to a control valve 266 having a manual actuating handle 268, said valve being connected by hydraulic conduits to the hydraulic motor 136 which actuates the conveyor 118 by which the sweepings are elevated to the receptacle 38 therefor. Although the driving mechanism specifically illustrated in FIGS. 2 and 3 utilizes the clutch mechanism comprising a belt-tightening idler roll 146 which effects driving relationship between the motor 136 and the driven pulley 144 which drives the spiral screw 150, it is contemplated in accordance with the principles of the invention that, if desired, said spiral screw may be driven by an independent fluid motor 270. Said motor conveniently can be connected by suitable coupling directly to the shaft or spiral screw or auger 150 and be supported by any suitable part of the mechanism.

If such independent motor 270 is used to actuate the spiral screw 150, it may be provided with a control valve 272, shown in the diagram of FIG. 10, said valve having a manually actuated handle 274. Fluid may be supplied to the control valve 272 from the same source that supplies control valve 266 for motor 136.

Pump P–3 is connected by appropriate hydraulic conduit means to a control valve 276 having a manually actuated handle 278, the valve being connected appropriately by conduits to hydraulic cylinder 218 by which the curb and pickup brushes are raised and lowered to dispose the same either in inoperative or operative positions. Particularly since hydraulic cylinder 218 is mounted relatively close to the hydraulic motor 160 which rotates the curb brush 154, it is convenient to provide a control valve 280, having a manually actuated handle 282 and arrange the valve 280 to be supplied with hydraulic fluid from the same source which supplies valve 276 for the hydraulic cylinder 218.

For purposes of simplifying the various views, only a limited number of hydraulic conduits are actually shown in certain of the figures but it is believed that no further illustration is necessary especially in view of the hydraulic fluid circuit diagram illustrated in FIG. 10, it being understood that the conduits employed are of conventional nature and are connected to the various elements supplied by them through conventional means such as normal clamps and the like.

When the street sweeping machine comprising the present invention is pulled during operation by a conventional tractor such as one providing a seat for the driver in the normal position over the rear tractor wheels, it is proposed by the present invention to provide convenient means to enable the driver of the tractor to control all movements of the various elements of the street sweeping machine. To this end, as illustrated in FIG. 1, a plurality of control rods which are connected suitably correspondingly to the manually-actuated handles for the various control valves in the fluid circuit diagram of FIG. 10, have been illustrated as extending forwardly from the power units and control valves of the street sweeping machine, whereby the forwardmost ends of said rods may comprise operating handles readily engageable by the driver of the tractor simply by turning slightly around in his seat, even while the tractor is pulling the street sweeping machine, if necessary or desired. Any appropriate supporting means for the forward ends of the valve-control rods shown in FIG. 1 might be employed such as the exemplary supporting member 284 which may be secured to the forward end of tongue 14 or to any other appropriate portion of the frame of the machine.

Alternate discharge means

There is illustrated in FIGS. 1 through 3, one embodiment of discharge means comprising a rearwardly extending trough 126 having a spiral screw 150 therein to move the material being discharged to the rear end of the trough 126 for exit through discharge opening 128. This mechanism comprises a very effective means but there are other embodiments of discharge mechanism contemplated for use with the present invention. Several additional contemplated discharge means are illustrated respectively in FIGS. 12 and 13, substantially in diagrammatic manner.

Referring to FIG. 12, it will be seen that the discharge mechanism shown therein comprises a side-delivery chute 286 which preferably extends outward from the side of body 10 adjacent the up-flight of conveyor 118 as viewed in FIG. 2, whereby normal movement of the buckets 122 along receiver 32 will pick up sweepings dumped upon receiver 32 when gate 56 is opened and elevate the same to the upper end of chute 286 for discharge movement therealong to the exterior of the machine. The portion of chute 286 which projects laterally sideways from the body 10 preferably is covered on all sides and the outer end normally is closed by a hinged cover 287. When the cover 287 is closed and the machine is operating to sweep a street or the like, the sweepings initially elevated will fall into chute 286 until it is full and then will continue to spill over into receptacle 38. When the machine is unloading however, cover 287 is opened, as shown in dotted lines in FIG. 12, and sweepings elevated to the inner end of chute 286 fall from the open outer end of chute 286 onto the ground or into a suitable receiver of any type.

As can be seen from FIG. 12, the chute 286 is somewhat curved and twisted to by-pass the up-flight of conveyor 118 (not shown) but the arrangement is such that the upper inner end of chute 286 will be positioned to receive sweepings elevated by the up-flight of conveyor 18 as said flight is re-directed across the top of body 10, as shown in FIG. 2, thereby dumping the buckets 122 into said inner end of chute 286.

The embodiment of discharge mechanism shown in FIG. 13 comprises a discharge trough or chute 288 which, in construction, can be quite similar to the trough 126 shown in FIGS. 1 through 3. However, particularly if it is desired to discharge the accumulated sweepings into a carrier, such as a truck, having relatively high walls on the body, the chute 288 preferably is pivotally supported for movement from the horizontal to an elevation of about 45° to the horizontal, to position the outer end of the chute 288 at a relatively high level. The spiral screw within the chute 288 is rotatably supported therein and likewise is mounted to pivotally move with said chute and such pivotal movement of the chute and screw is effected preferably by a hydraulic cylinder and piston unit 290 extending between body 10 and chute 288 to not only move but hold the desired position thereof at any desired permitted elevation.

*Sprinkling means*

Particularly for purposes of controlling the scattering of dust by the machine and especially dust which might be raised by the curb brush 154, the invention also contemplates the use of suitable sprinkling means such as a water supply tube 292, shown in exemplary manner in FIGS. 1 and 6, which extend forwardly of the curb brush 154 and may be supported appropriately by the frame of the machine in any suitable manner. The tube 292 may be provided either with spray discharge holes formed directly therein or a series of conventional diffusing nozzles may be employed in accordance with conventional practice. The tube 292 is supplied with water from a suitable reservoir tank 294 which, conveniently, is contained within the confines of the body 10. One appropriate location for such tank is immediately adjacent the rear wall 36 of the receptacle 38, as best shown in FIG. 3. Such location not only utilizes waste space but also enhances the appearance of the body of the machine in that the frame of the body preferably extends rearwardly to cover the pickup brush 74 both during operation thereof as well as when the same is elevated to inoperative position. A suitable filling inlet neck 296, see FIG. 3, preferably is provided at the upper end of tank 294 and extends through the rear panel 28 of the housing 10. Under normal circumstances, pump means usually are employed to insure proper pressure for the spray. If no sprinkling is desired, the feed to the discharge pipe 292 may be discontinued by closing an appropriate control valve, not shown, in the supply line.

From the foregoing, it will be seen that the present invention comprises a compact, highly efficient, and readily maneuverable street sweeping machine which, principally by utilizing certain elements or mechanisms in dual capacities, substantially reduces the cost of fabrication of the machine as well as the cost of operating it. One such dual function occurs with respect to the conveyor 118 which is utilized both to elevate sweepings into the receptacle 38 and also to discharge the sweepings from the machine when it is desired to unload the same. The employment of a single actuating means for raising both the pickup and curb brushes is another example of economy in operating functions and mechanisms. The machine also embodies means to effect greater efficiency in sweeping operations through the employment of end guards 88 adjacent opposite ends of the pickup brush 74, as well as guides 98 which direct sweepings adjacent the ends of the brush into the receiver 32 so as not to leave unsightly street sweepings along the surface being cleaned by the pickup brush 74. Further, it is to be understood that the curb brush 154 may be mounted at either side of the machine, in accordance with the spirit of the invention, or even under unusual conditions, curb brushes may be mounted at both sides of the machine for either selective individual or simultaneous use.

While the invention has been described and illustrated in its several preferred embodiments, it should be understood that the invention is not to be limited to the precise details herein illustrated and described since the same may be carried out in other ways falling within the scope of the invention as claimed.

We claim:

1. A street sweeper having wheel means to support the same for mobile operation and comprising in combination, a pickup brush supported transversely of said sweeper, means to rotate said brush, means to receive sweepings from said brush, receptacle means to hold accumulated sweepings, conveyor means to move sweepings from said receiving means to said receptacle means, discharge means operable to unload accumulated sweepings from said sweeper, and power means operable selectively to drive said conveyor means to move sweepings from said receiving means to said receptacle means or operate said discharge means to unload accumulated sweepings from said receptacle means.

2. The street sweeper according to claim 1 in which said power means is hydraulically operable, and said discharge means extends rearwardly relative to said receiving means for said sweepings.

3. The street sweeper according to claim 1 in which said receptacle means comprises hopper means having one wall portion movable between open and closed positions and when in the open position being arranged to permit emptying of the accumulated contents of said receptacle means therefrom for engagement by said discharge means to unload said accumulated sweepings from said sweeper.

4. The street sweeper according to claim 1 further including clutch means between said power means and said discharge means operable manually to effect operation of said discharge means when it is desired to empty said receptacle means.

5. The street sweeper set forth in claim 1 further characterized by said receptacle means comprising hopper means having a portion of the lower part thereof movable between open and closed positions, said portion when in open position being arranged to permit emptying of said receptacle means onto said receiving means, whereby said conveying means then can be arranged to convey such emptied sweepings to said discharge means.

6. The street sweeper set forth in claim 5 further characterized by said receiving means for said sweepings comprising a shelf extending rearwardly in the lower part of said sweeper adjacent said brush to receive sweepings therefrom and said conveyor means comprising buckets movable along said shelf to scrape up sweepings therefrom and elevate the same to the upper portion of said sweeper and dump the sweepings into said hopper means, said movable portion of the lower part of said hopper comprising a movable wall section adjacent said shelf and capable of being adjustably opened to discharge accumulated sweepings onto said shelf at a desired rate for removal from said sweeper.

7. The street sweeper set forth in claim 5 further characterized by said discharge means comprising additional conveying means extending from the upper part of said hopper means to and beyond an exterior wall of said sweeper and arranged to receive sweepings moved by said first-mentioned conveyor means for discharge movement beyond said sweeper.

8. The street sweeper set forth in claim 7 further characterized by said additional conveyor means comprising a screw conveyor and drive means therefor selectively operable when unloading is desired and extending at one end in a generally lateral direction beyond one end of said sweeper.

9. The street sweeper set forth in claim 8 further characterized by said one end of said screw conveyor being below the uppermost course of said first mentioned conveyor to intercept and receive sweepings elevated thereby for dumping into said hopper means and remove them from the sweeper when said screw conveyor is energized by the drive means therefor.

10. The street sweeper set forth in claim 5 further characterized by said discharge means comprising chute means in one side of said sweeper adjacent said conveyor means, whereby said conveyor means is operable to move to said chute means sweepings discharged from said hopper means onto said receiving means.

11. A street sweeper having wheels to support the same and comprising in combination, a frame for said sweeper, a pickup brush extending transversely across the lower portion of said sweeper, linkage supporting means movably mounted adjacent opposite sides of said frame and supporting opposite ends of said pickup brush for movement between raised inoperative and lowered operative positions, power means connected to and operable to rotate said brush, a curb brush positioned for rotation about a substantially vertical axis, supporting means on said frame adjacent one side thereof forwardly of said pickup brush and connected to said curb brush, said supporting means being movable to permit raising of said curb brush from lowered operative position to elevated inoperative position, power means connected to and operable to rotate said curb brush about its axis, actuating means comprising a lever pivotally supported by said frame, a plurality of flexible tension means connected respectively at one end to said linkage supporting means for said pickup brush and the supporting means for said curb brush, guide means for said flexible tension means to support the same for connection of the other ends thereof commonly to said actuating means, additional power means connected to said actuating means and operable to raise said brushes simultaneously to the inoperative positions thereof and holding means operably engageable with said supporting means for said curb brush, whereby when both of said brushes are elevated to inoperative position said holding means can be interconnected to said supporting means for said curb brush to prevent lowering of said curb brush when said pickup brush is lowered as when operation of the curb brush is not required.

References Cited by the Examiner

UNITED STATES PATENTS

| | | | |
|---|---|---|---|
| 649,609 | 5/00 | Layman et al. | 15—85 |
| 1,456,393 | 5/23 | Martin | 15—82 X |
| 1,534,233 | 4/25 | Lundy | 15—340 |
| 1,904,881 | 4/33 | Presbrey | 15—87 |
| 2,286,245 | 6/42 | Wilson | 15—83 |
| 2,327,879 | 8/43 | Farrar | 15—87 |
| 2,637,055 | 5/53 | Mott | 15—83 |
| 2,833,116 | 5/58 | Rush | 15—83 X |
| 2,972,159 | 2/61 | Swanson | 15—83 X |
| 2,996,742 | 8/61 | Aimers et al. | 15—87 |

FOREIGN PATENTS

| | | |
|---|---|---|
| 194,779 | 3/23 | Britain. |
| 654,239 | 12/37 | Germany. |
| 357,427 | 11/61 | Switzerland. |
| 241,240 | 10/62 | Australia. |

CHARLES A. WILLMUTH, *Primary Examiner.*